Inventor
Ella A. Ault

By Talbert & Parker
Attorneys

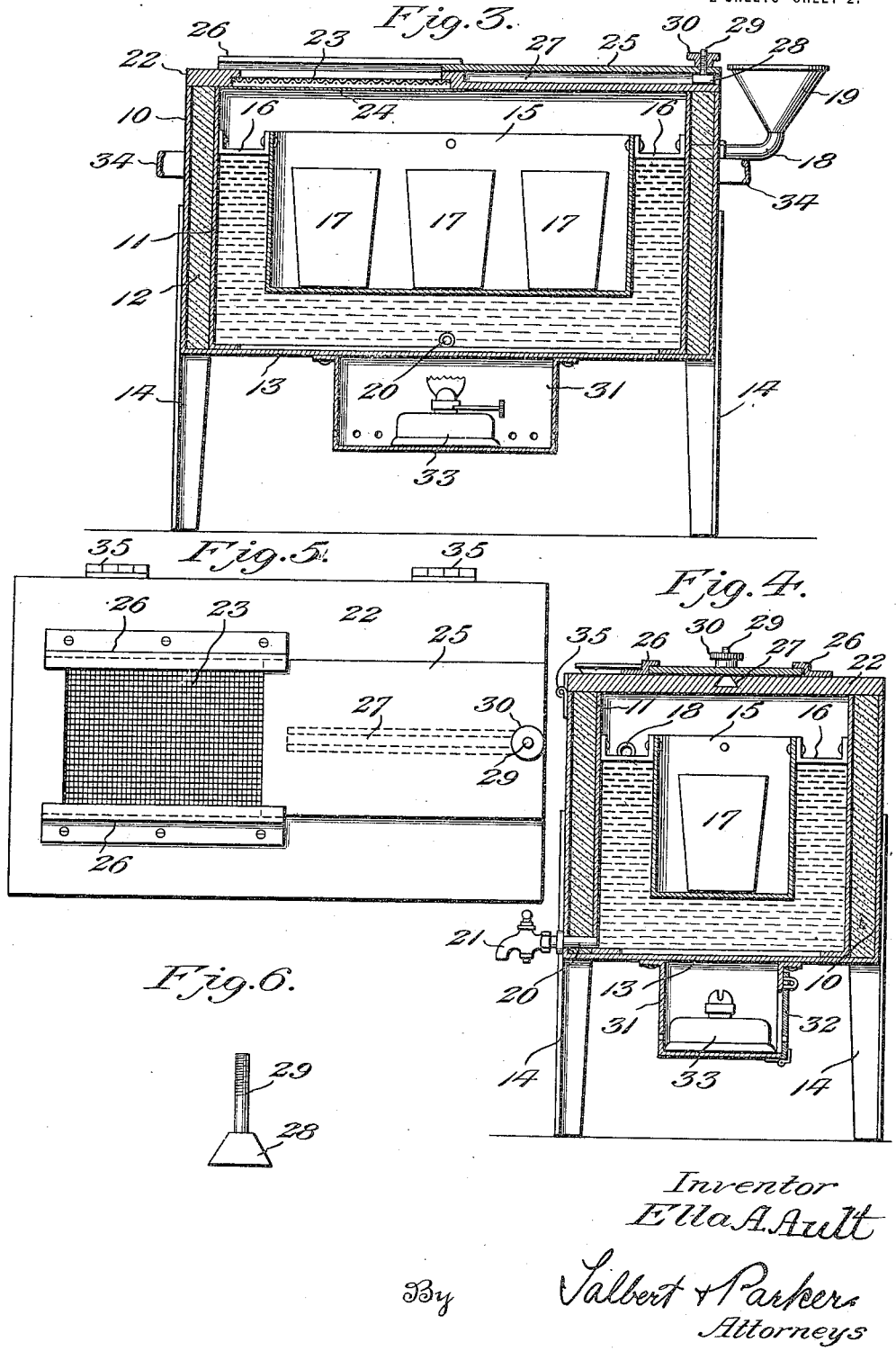

UNITED STATES PATENT OFFICE.

ELLA A. AULT, OF CRAFT, TEXAS.

MILK-WARMER.

1,278,562.

Specification of Letters Patent. Patented Sept. 10, 1918.

Application filed February 3, 1917. Serial No. 146,314.

*To all whom it may concern:*

Be it known that I, ELLA A. AULT, a citizen of the United States, residing at Craft, in the county of Cherokee and State of Texas, have invented certain useful Improvements in Milk-Warmers, of which the following is a specification, reference being had therein to the accompanying drawing.

The present invention relates to a device for heating milk with the purpose of souring the same in the preparation of the milk for churning.

It is an object of the present invention to provide a device of this character which entirely houses the milk, and by means of which the milk may be maintained at a constant predetermined temperature to effect the souring of the milk in a relatively short time, and to protect the milk during this treatment.

It is another object of the present invention to provide a housing or cabinet for the milk which has an air vent or opening protected to prevent access of dust to the cabinet, and which may be opened and closed to the desired extent for regulating the passage of air into and from the cabinet.

The above and other objects and advantages of this invention will be more particularly brought out in the following specific description of the present preferred embodiment, the same being illustrated in the accompanying drawings, wherein Figure 1 is a front elevation of a device constructed according to the present invention;

Fig. 3 is a longitudinal vertical section taken centrally through the device;

Fig. 4 is a transverse section taken centrally through the device; and

Fig. 5 is a detail plan view of the cover.

Fig. 6 is a side elevation of the dove-tail block and its stem for use with the cover.

Figure 1:
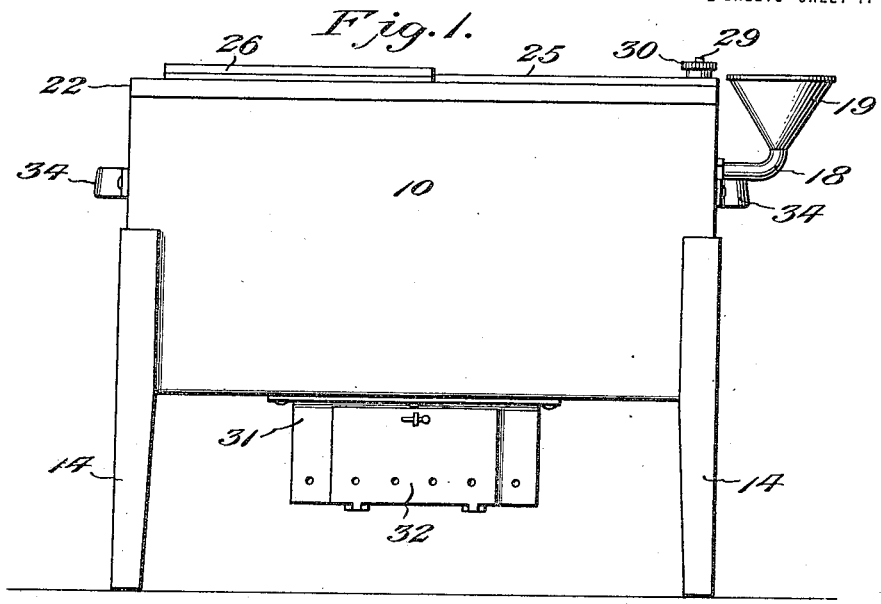
Figure 2:
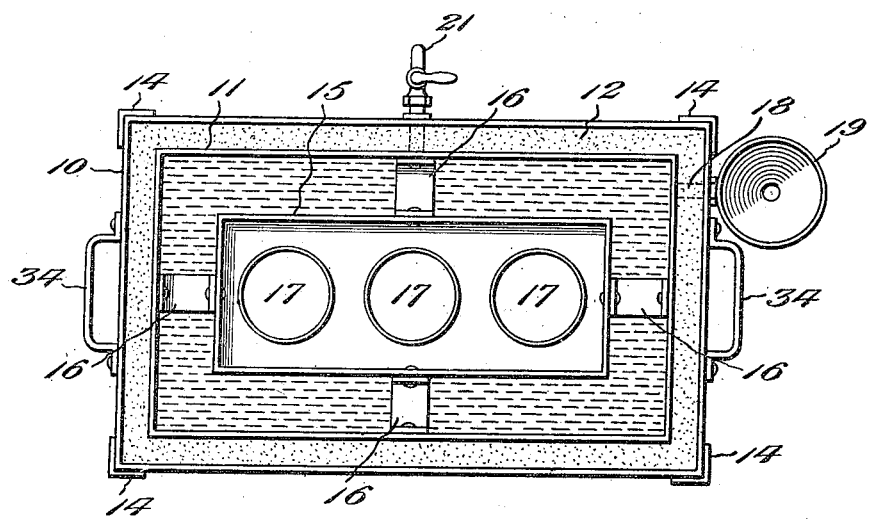
Fig. 2 is a top plan view thereof, with the cover removed.

Referring to these drawings, wherein like numerals indicate similar parts throughout the several views, 10 designates an outer shell provided with an inner shell 11 spaced from the inner walls of the outer shell and providing therebetween a space adapted to be filled with a heat non-conducting packing 12. The shells 10 and 11 have a common bottom 13, and are supported at a suitable distance above the ground or floor by legs 14 of any approved form.

A relatively small container 15 is arranged within the shell 11, and is supported centrally therein by means of straps 16 or the like, which project inwardly from the shell 11 and are secured to the ends and sides of the container 15 for suspending the latter above the bottom 13 and holding it in spaced relation from the end and side walls of the shell 11. The container 15 is adapted to receive a number of receptacles 17 in which milk or the like may be placed when it is desired to warm or heat the same.

The chamber within the shell 11, and between the walls thereof and the container 15, is adapted to be filled with a body of water, the same being introduced into the cabinet or device through a water inlet pipe 18 which extends inwardly through the shells 10 and 11 and may be provided upon its upper end with a funnel 19 or the like, into which water may be easily poured. A drain pipe 20 is arranged adjacent to the bottom 12 of the cabinet and projects rearwardly through the shells 11 and 10, respectively, and is provided upon its outer end with a spigot 21 or the like for closing the drain pipe.

For the purpose of protecting the milk or other material placed in the container 15, and for retaining the heat within the cabinet, a cover 22 is provided, the same being seated upon the upper edges of the shells 10 and 11 and having, near one end, a screen 23, or other foraminous diaphragm, admitting of the passage of air through the cover. Beneath the screen 23 is placed a sheet of cloth 24, or the like, permitting free passage of air through the cover and at the same time excluding dust and the like which passes through the screen 23. The cover 22 is provided with a slide or closure 25 which is mounted to slide on the upper face of the cover 22 and is guided by means of strips 26 secured to the top of the cover 22 and adjacent to the opposite longitudinal edges thereof. The closed end of the cover 22 is provided with a longitudinally extending dove-tail slot 27 into which is fitted a dove-tail block 28, the latter having a stem 29 projecting upwardly through an opening formed in the slide 25 and carrying a thumb nut 30 adapted to be tightened against the top of the slide to bind the block 30 in the groove 27. When the thumb nut 30 is loosened, the slide 25 may be moved into position over the screen 23, to more or less close the air opening through the cover 22. The slide may be secured in such adjusted position by the thumb screw 30.

For heating the body of water in the cabinet, and thus heating the milk or other material placed in the container 15, a heating chamber 31 is suspended beneath the bottom 13, preferably intermediate the ends thereof. The heating chamber 31 is closed on all sides, except for air vents which may be required, and provided at its front with a hinged door 32 adapted to be swung open for placing a lamp 33 or the like within the heating chamber. Handles 34 may be secured to the opposite ends of the cabinet to permit easy lifting of the same for transporting the cabinet from place to place, as desired.

In use, a quantity of water is poured through the funnel 19 and pipe 18 into the water chamber, the water being of a height slightly less than the plane of the top edge of the receptacle 15. The milk is placed in the receptacles 17 and the latter are positioned in the container 15. The cover 22 is now secured over the cabinet, and the lamp 33, or other heating element, may be placed in the heating chamber 31 to heat the body of water which, in turn, raises the temperature of the interior of the cabinet and heats the milk placed in the container. The slide 25 may now be adjusted over the screen 23 to regulate the ventilation of the interior of the cabinet.

It is apparent that the cabinet may be used for the purpose of cooling milk or the like placed in the container 15 by introducing relatively cold water through the pipe 18 into the water chamber, and the latter may even be provided with a quantity of ice for maintaining the interior of the cabinet at a relatively low temperature. The cover 22 may be hinged, as at 35, to the rear side of the cabinet so that the cover will not become separated from the cabinet and at the same time access may be quickly had to the interior thereof by simply raising the cover.

It is of course understood that various changes and modifications may be made in the details of construction of the above specifically described cabinet without departing from the spirit of the invention, and being restricted only by the scope of the following claims.

Having thus described my invention, I claim:

1. In a cabinet as specified, a hollow body, a container suspended in the body, means for introducing a quantity of water in the body about the container, means for heating the water to heat the contents of the container, a cover adapted to close the top of the container, a foraminous panel in the cover to permit passage of air through the cover, a fabric sheet arranged beneath the screen to collect dust and the like passing through the screen, and an adjustable slide carried by the cover for adjustment over the screen to control the passage of air through the cover.

2. A cabinet as specified comprising inner and outer shells spaced apart and having a common bottom, a heat non-conducting packing arranged between the shells, a container supported within the inner shell and being spaced from the bottom and inner walls thereof, an inlet pipe extending through said shells and opening into the space between the inner shell and the container, a normally closed drain connected to the lower end of said shells and opening inwardly through the inner shell, a cover adapted to close the top of the cabinet, a screen panel in the cover, a fabric sheet stretched beneath the screen panel to arrest dust passing through the screen panel, a slide carried by the cover adapted for adjustment over said screen panel, and means for securing the slide in adjusted position.

In testimony whereof I affix my signature.

ELLA A. AULT.